(12) United States Patent
Trask et al.

(10) Patent No.: US 8,346,740 B2
(45) Date of Patent: Jan. 1, 2013

(54) FILE CACHE MANAGEMENT SYSTEM

(75) Inventors: Barrett Trask, Fort Collins, CO (US); Robery Gilanyi, Fort Collins, CO (US); Arthur L. Sabsevitz, Monroe Township, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1634 days.

(21) Appl. No.: 11/187,149

(22) Filed: Jul. 22, 2005

(65) Prior Publication Data

US 2007/0022143 A1 Jan. 25, 2007

(51) Int. Cl.
*G06F 7/00* (2006.01)
(52) U.S. Cl. .......................................... 707/694
(58) Field of Classification Search .................. 707/200, 707/694; 711/170; 705/8
See application file for complete search history.

(56) References Cited

U.S. PATENT DOCUMENTS

| | | | |
|---|---|---|---|
| 5,062,055 A * | 10/1991 | Chinnaswamy et al. | ..... 702/182 |
| 6,314,561 B1 | 11/2001 | Funk | |
| 6,421,761 B1 | 7/2002 | Arimilli | |
| 6,587,937 B1 | 7/2003 | Jensen | |
| 6,701,359 B1 | 3/2004 | Calabrez | |
| 6,757,786 B2 | 6/2004 | Metayer | |
| 6,792,436 B1 | 9/2004 | Zhu | |
| 2002/0026561 A1 | 2/2002 | Park | |
| 2003/0061444 A1 | 3/2003 | Herbst et al. | |
| 2003/0143988 A1* | 7/2003 | Jamadagni | ..................... 455/418 |
| 2004/0034746 A1* | 2/2004 | Horn et al. | ..................... 711/141 |
| 2004/0107319 A1 | 6/2004 | D'Orto | |
| 2004/0193803 A1 | 9/2004 | Mogi | |
| 2004/0193827 A1* | 9/2004 | Mogi et al. | ..................... 711/170 |
| 2005/0033621 A1* | 2/2005 | Hartmann et al. | ................. 705/8 |
| 2005/0044321 A1 | 2/2005 | Bialkowski | |
| 2005/0055506 A1 | 3/2005 | Dement | |
| 2005/0060483 A1 | 3/2005 | Azuma | |
| 2005/0154821 A1* | 7/2005 | Furuhashi et al. | ............. 711/112 |
| 2006/0143395 A1* | 6/2006 | Zohar et al. | ..................... 711/133 |

* cited by examiner

*Primary Examiner* — Truong Vo

(57) ABSTRACT

In one embodiment a method of file cache management in a computer system comprises creating a resource group; developing one or more cache management policies for the resource group; and managing one or more subsequent requests for cache memory in accordance with the one or more cache management policies.

24 Claims, 8 Drawing Sheets

FILE CACHE MANAGEMENT SYSTEM

TECHNICAL FIELD

This application relates to electronic computing, and more particularly to a file cache management system.

BACKGROUND

Computer system efficiency remains an important issue. In a multi-process computing environment, processes compete for computing resources, including cache memory. Adroit management of cache memory resources is desirable.

SUMMARY

In one embodiment a method of file cache management in a computer system comprises creating a resource group; developing one or more cache management policies for the resource group; and managing one or more subsequent requests for cache memory in accordance with the one or more cache management policies.

DETAILED DESCRIPTION

Described herein are exemplary systems and methods for managing a file system cache in a computer system. The methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

Figure 1:
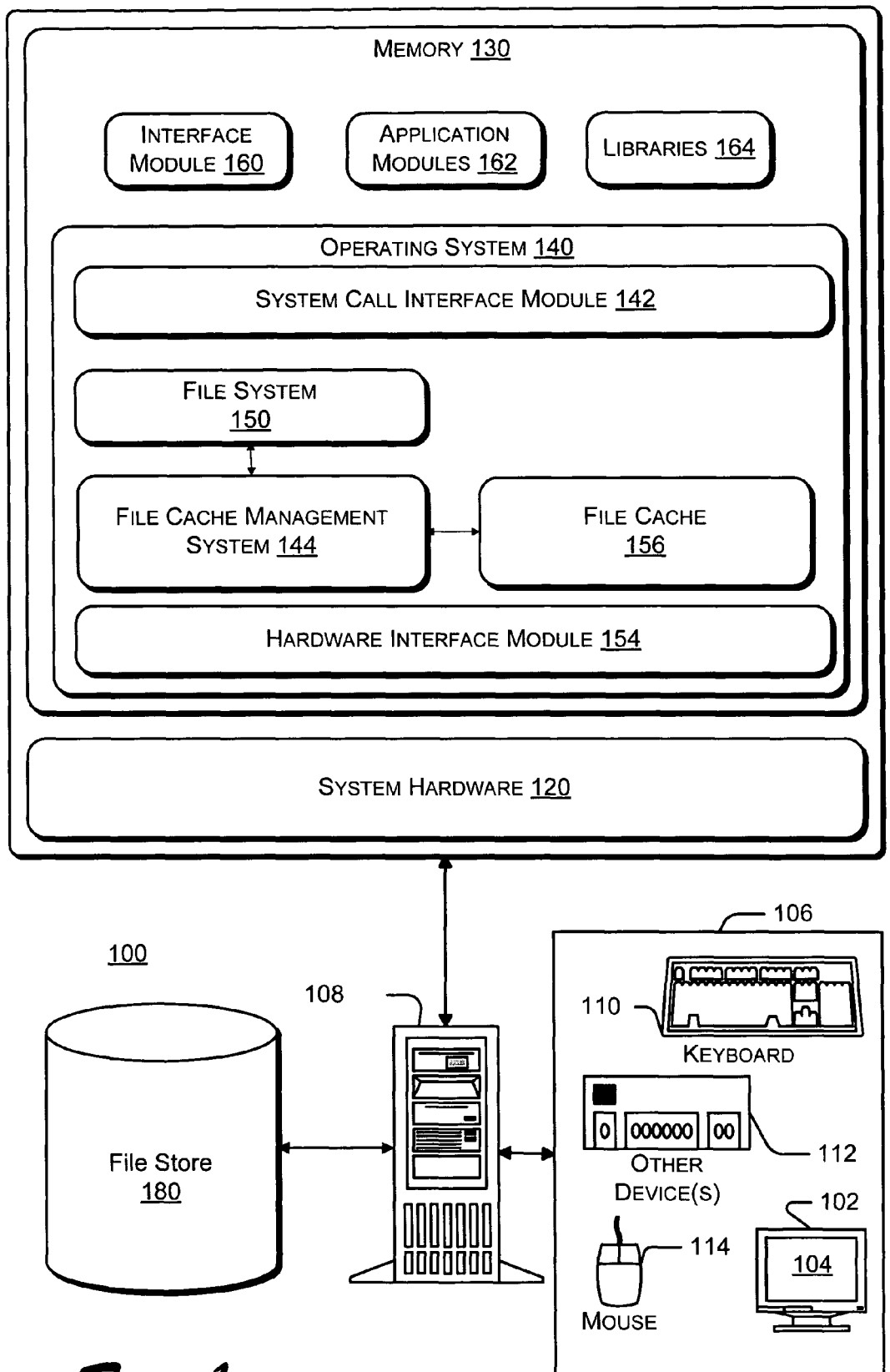
FIG. 1 is a schematic illustration of one embodiment of a file cache management system.

FIG. 1 is a schematic illustration of an exemplary computer system adapted to include a file cache management system 100. The file cache management system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes a file system 150 that manages files used in the operation of computer 108. Operating system 140 further includes a system call interface module 142 that provides an interface between the operating system 140 and one or more application modules 162 and/or libraries 164.

In operation, one or more application modules 162 and/or libraries 164 executing on computer 108 make calls to the system call interface module 142 to execute one or more commands on the computer's processor. The system call interface module 142 invokes the services of the file system 150 to manage the files required by the command(s) and may invoke the services of a process control subsystem (not shown) to manage the process required by the command(s). The file system 150, in turn, invokes the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In one embodiment operating system 140 includes a file cache management system 144 interposed logically between the file system(s) 150 and underlying modules such as, e.g., the hardware interface module 154. File cache management system 144 interfaces with the file system(s) 150 to manage the file cache 156 as a resource that may be shared between users of the computer system, e.g., on a per-workload basis.

An interface module 160 resides at the application (i.e., user) level to provide an interface with file cache management system 144. In operation, an administrator (or administration software) may use the interface module 160 to establish policies for managing the file cache 156. The file cache management system 144 may be configured to use one or more cache management policies to manage the file cache 156 in memory 130. Details of the operation of access management system are described below.

Exemplary Embodiments of Operations

Figure 2:
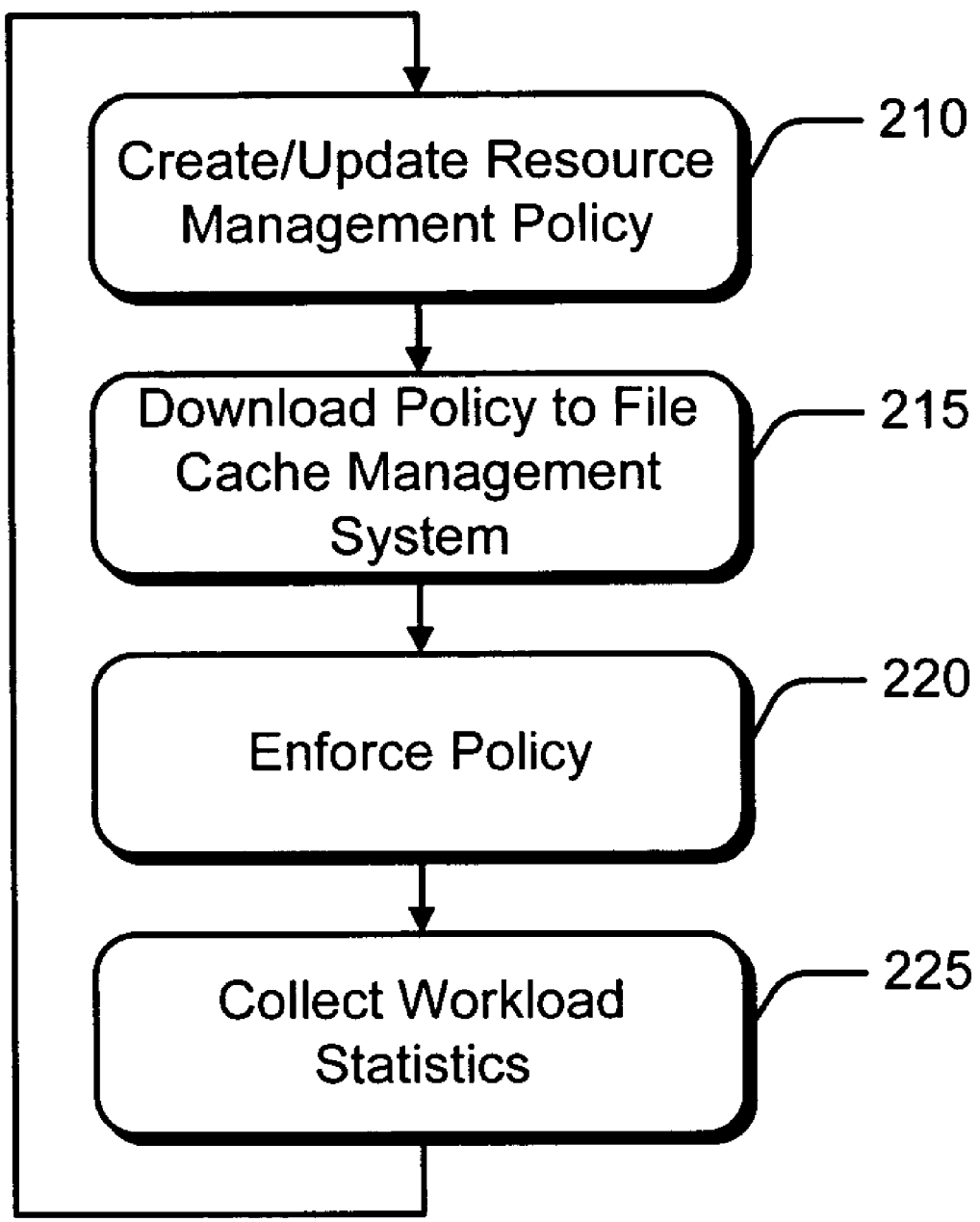
FIG. 2 is a flowchart illustrating high-level operations in one embodiment of a method of managing file cache.

FIG. 2 is a flowchart illustrating high-level operations in one embodiment of a method of managing file cache. Referring briefly to FIG. 2, at operation 210 a resource management policy is created (or updated either statically or dynamically). Operation 210 may be performed by an administrator using the interface module 160, or by management software. At operation 215 the cache management policy is downloaded to the file cache management system 144. At operation 220 the file cache management system 144 enforces the cache management policy to manage the system cache in accordance with the policy established in operation 210. In some embodiments the file cache management system 144 may collect workload statistics (operation 225), which may be provided as feedback to the interface module 160. High-level operations depicted in FIG. 2 are explained in greater detail in the following text and the flowcharts of FIG. 3-FIG. 7.

Figure 3:
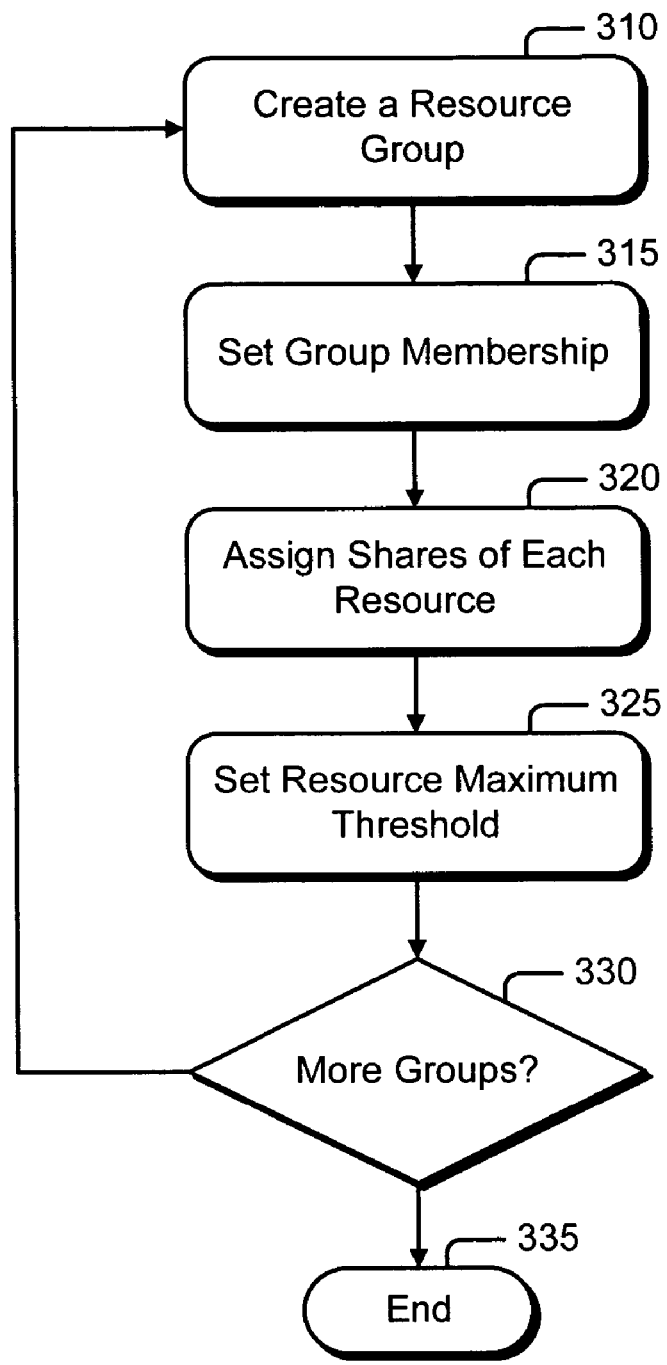
FIG. 3 is a flowchart illustrating operations in one embodiment of allocating system resources to a resource group.

FIG. 3 is a flowchart illustrating operations in one embodiment of allocating system resources to a resource group. The operations of FIG. 3 permit a resource group(s) to be defined and to have system resources including, e.g., file cache memory assigned to members of the resource group. As used herein, the term "resource group" refers to a set of processes that work under the same set of constraints (or entitlements) on system resources. In one embodiment, the operations depicted in FIG. 3 may be the operations implemented by the interface module 160.

At operation 310 a resource group is created, and at operation 315 the group membership of the resource group is set. In one embodiment the interface module 160 may present a collection of processes on a user interface such as, e.g., a computer display, such that an administrator can manually select a group of processes to define the members of a resource group. In alternate embodiments processes may be collected into a resource group automatically by characteristics of the processes.

At operation 320 minimum, guaranteed shares of system resources are assigned to the resource group. In one embodiment a particular resource group receives a resource entitlement (i.e., a minimum resource allocation) that corresponds to a percentage of the resource that corresponds to the number of shares allocated to a particular group divided by the total shares allocated for the resource. In one embodiment the interface module 160 provides a user interface that permits an administrator to assign shares of a selected resource such as, e.g., file cache 156 to the resource group. In alternate embodiments resources may be allocated automatically using any conventional resource allocation routine.

In one embodiment, a maximum value (i.e., a threshold) is set on the resource(s) allocated to the resource group, in operation 325. The maximum threshold may be set by an administrator via the interface module 160 or by a resource allocation routine. It, at operation 330, there are more resource groups to be defined, then control passes back to operation 310 and the process is repeated. By contrast if, at operation 330, there are no more resource groups to define, then control passes to operation 335 and the process terminates.

The resource allocations established by operations 310-325 may be transmitted from the interface module 160 to the file cache management system 144 (operation 215), which implements the resource allocations as a file cache management policy to manage the file cache 156.

Figure 4:
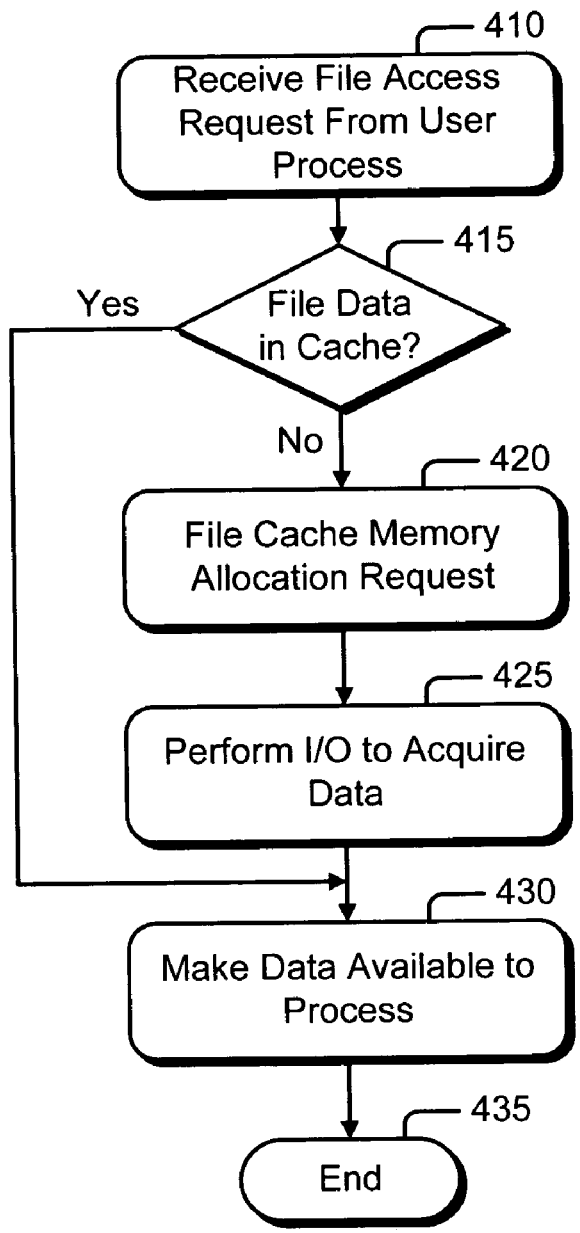
FIG. 4 is a flowchart illustrating operations in one embodiment of executing an input/output (I/O) request.

FIG. 4 is a flowchart illustrating operations for executing an input/output (I/O) request. In one embodiment, the operations of FIG. 4 may be performed by the file system 150, the file cache management system 144, or a combination thereof. At operation 410 a file access request is received from a user process. The file access request may originate from a user application or from a user request to the file system 150. If, at operation 415, the file data requested in the user file access request resides in the file cache 156, then control passes to operation 430, and the data is made available to the requesting user process, e.g., by retrieving the data from file cache 156.

By contrast, if at operation 415 the requested data is not in the file cache 156, then control passes to operation 420 and a file cache memory allocation request is executed to allocate a section of the file cache 156 for the data responsive to the file access request. At operation 425 an I/O operation is executed to retrieve the data responsive to the I/O request into the file cache 156. In one embodiment the I/O operation may include executing a read operation to one or more persistent storage devices such as, e.g., a hard disk drive, an external disk drive, network attached storage, a storage area network, or the like. Then, at operation 430 the data is made available to the requesting user process, e.g., by retrieving the data from file cache 156.

Figure 5:
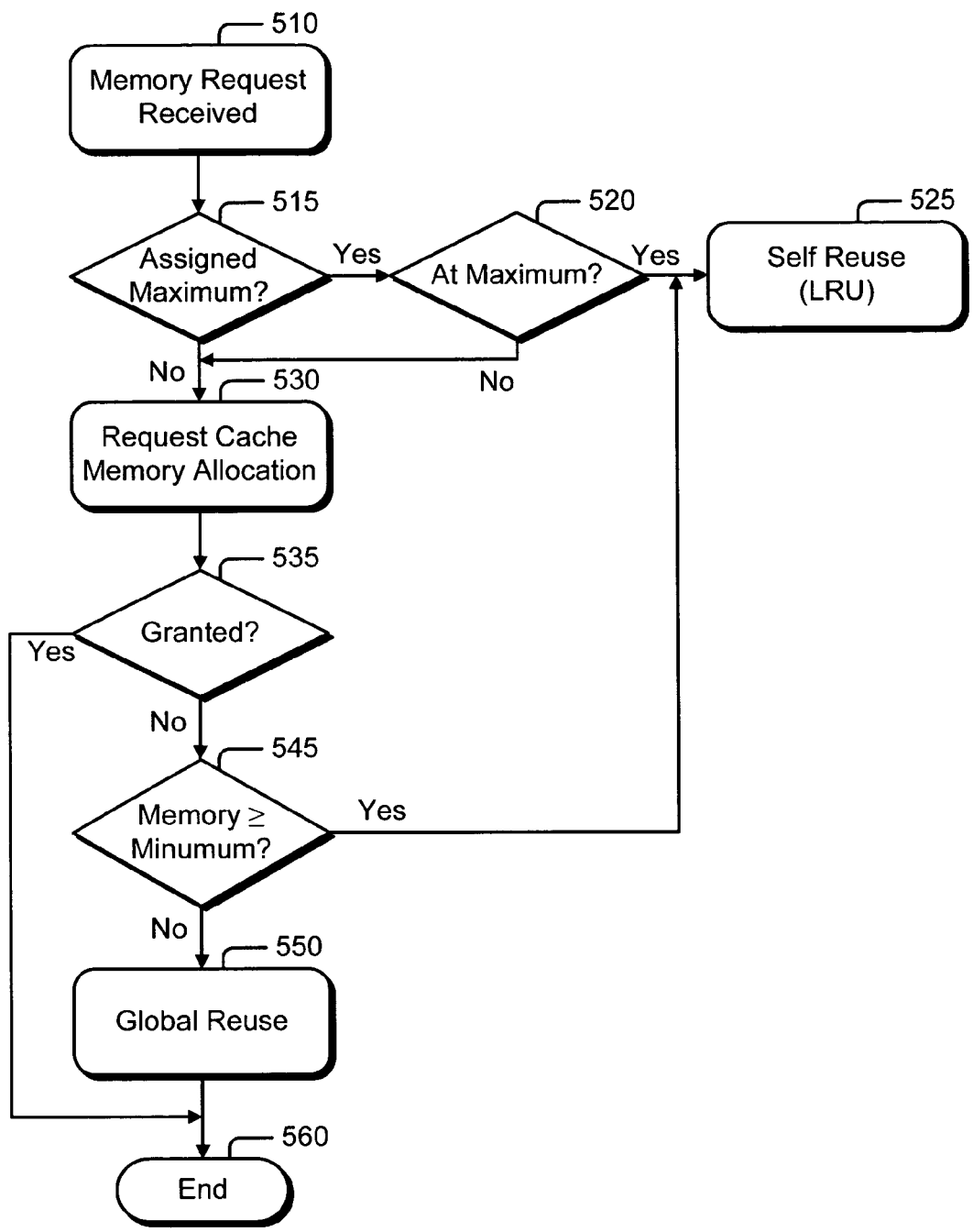
FIG. 5 is a flowchart illustrating operations in one embodiment of managing cache memory.

FIG. 5 is a flowchart illustrating operations in one embodiment of managing cache memory. In one embodiment the operations of FIG. 5 may be executed by the file cache management system 156. Referring to FIG. 5, at operation 510 a request for file cache memory is received. In one embodiment the memory request may have been generated in operation 420. If, at operation 515, a maximum threshold has been assigned to the file cache in this resource group, then control passes to operation 520. If, at operation 520, the resource group is at its maximum threshold of the file cache resource, then control passes to operation 525 and a self-reuse algorithm is implemented. In one embodiment a least-recently used (LRU) cache algorithm may be implemented, although other algorithms may be used.

If the file cache is not capped (i.e., no maximum threshold assigned) for this resource group (operation 515) or if the file cache is capped for this resource group, but the resource group is not at the specified threshold (operation 520), then control passes to operation 530, and a request for file cache memory allocation is made from a separate memory manager. If, at operation 535, the allocation of file cache memory is successful, then control passes to operation 560, and the operation terminates. By contrast, if at operation 535 the allocation of file cache memory is not successful, then control passes to operation 545. If, at operation 545, the amount of resources (e.g., file cache memory) dedicated to the resource group exceeds the entitlement (i.e., minimum threshold) allocated to the resource group in operation 320, then control passes to operation 525, and a self-reuse algorithm is implemented. In one embodiment a least-recently used (LRU) cache algorithm may be implemented, although other algorithms may be used.

If, at operation 545, the amount of resources dedicated to the resource group does not exceed the entitlement (i.e., minimum threshold) allocated to the resource group in operation 320, then control passes to operation 550 and a global reuse technique is implemented. One global reuse technique is explained with reference to FIG. 6.

Figure 6:
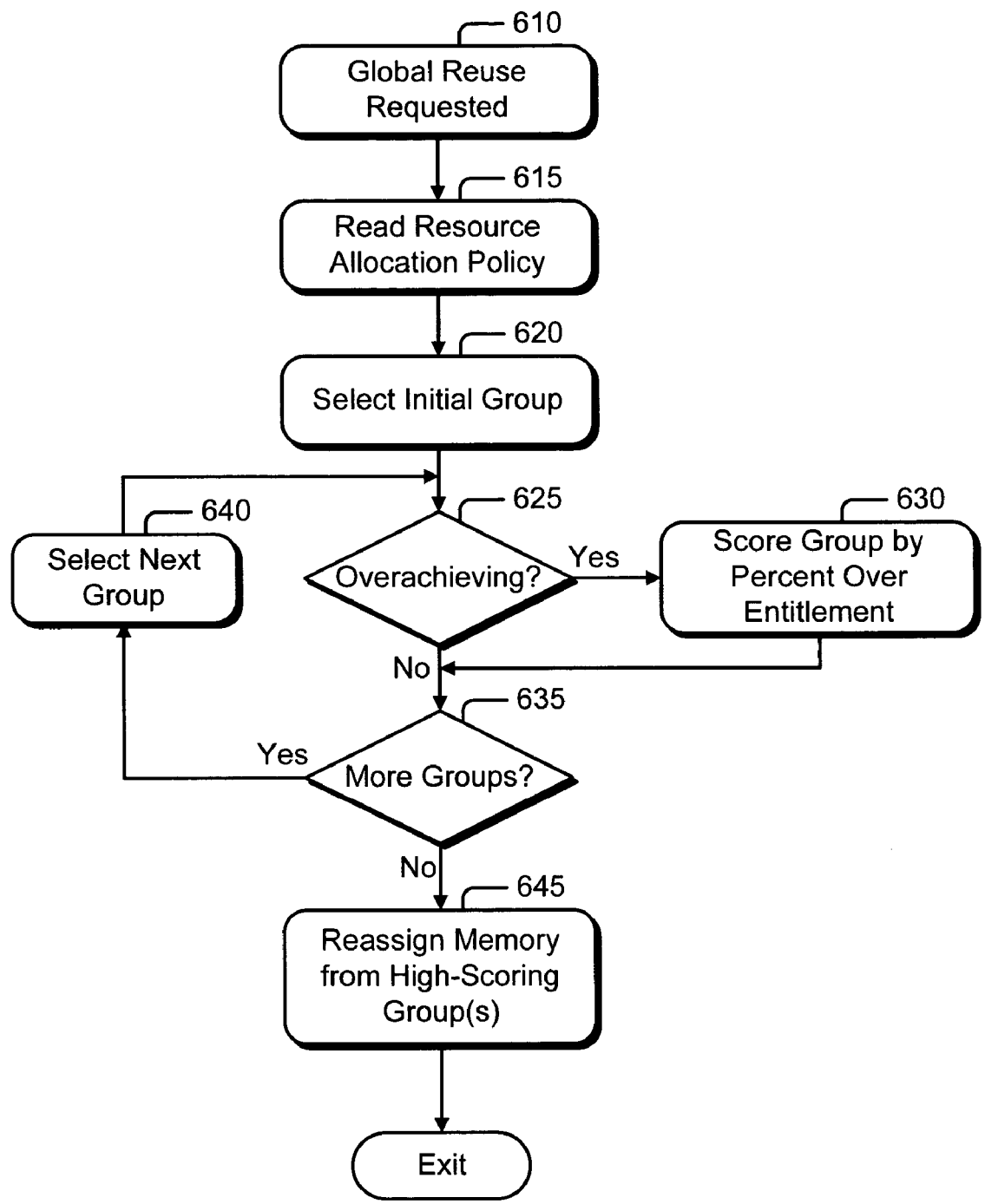
FIG. 6 is a flowchart illustrating operations in one embodiment of managing cache memory.

FIG. 6 is a flowchart illustrating operations in one embodiment of managing file cache memory when a global resource reallocation is executed, e.g., when the file cache memory is reallocated among multiple competing resource groups.

At operation 610 a global reuse request is received, e.g., from operation 550, and at operation 615 the resource allocation policy is read. In one embodiment the resource allocation policy corresponds to the resource allocation policy generated via the interface module 160 by an administrator.

Operations 620-635 define a loop that scores the resource groups competing for the resource of the cache memory 156. At operation 620 an initial group is selected for evaluation. If, at operation 625 the initial group is not overachieving (i.e., using more than the amount of cache memory resource allocated to the group by the resource allocation policy), and there are more groups (operation 635) then the next group is selected and control passes back to operation 625.

If, at operation 625, the selected group is overachieving, then control passes to operation 630, and the group is assigned a score that corresponds to an amount by which it is exceeding the new resource entitlement assigned to the group by the resource allocation policy. In one embodiment the score may correspond to a percentage by which the resource group exceeds its resource allocation. In another embodiment the score may correspond to an absolute amount by which the resource group exceeds its resource allocation. In another embodiment, the new resource entitlement is based on the expected total file cache memory after the size of the file cache has been reduced as a result of this request. For example, if the resource group exceeds its allocation of cache memory by a 500 MB, then the score may correspond to the 500 MB. The group scores may be stored in a suitable memory location such as, e.g., a non-volatile or a volatile memory location.

If, at operation 635, there are no more groups to score then control passes to operation 645 and the resource (e.g., cache memory) is reassigned from one or more high-scoring groups.

Unlike other computing resources such as, e.g., processor cycles, the amount of file cache memory may dynamically change over time. When the file cache memory increases in size, the additional cache memory may be allocated to resource groups on request or by a suitable heuristic. When the file cache memory decreases in size, cache memory resources may need to be deallocated or reclaimed from one or more resource groups.

In one embodiment, file cache memory may be reclaimed in proportion to the relative share of memory consumed by a particular resource group(s). By way of example, in one instance there may be three resource groups identified by A, B, and C, which have entitlements of 25%, 25%, and 50% of the memory, respectively. Group A is overachieving by 50 units and group C is overachieving by 110 units. If for some reason the available file cache memory is reduced by 100 units, then the remaining 60 units of excess cache memory may remain in groups A and C in proportion to their relative entitlements by permitting A to retain (25/75)*60=20 units, and permitting C to keep (50/75)*60=40 units. Hence, A would contribute 30 units and C would contribute 70 units.

Other possible allocation routines may be used. For example, the entire file cache memory allocation may be drawn from the resource group that is overachieving by the highest amount. In the previous example, resource group C would contribute the entire 100 units. In the event that the resource group that is overachieving by the greatest amount cannot satisfy the memory allocation, the balance may be drawn from the resource group that is the next-highest in overachieving, and so on.

Figure 7:
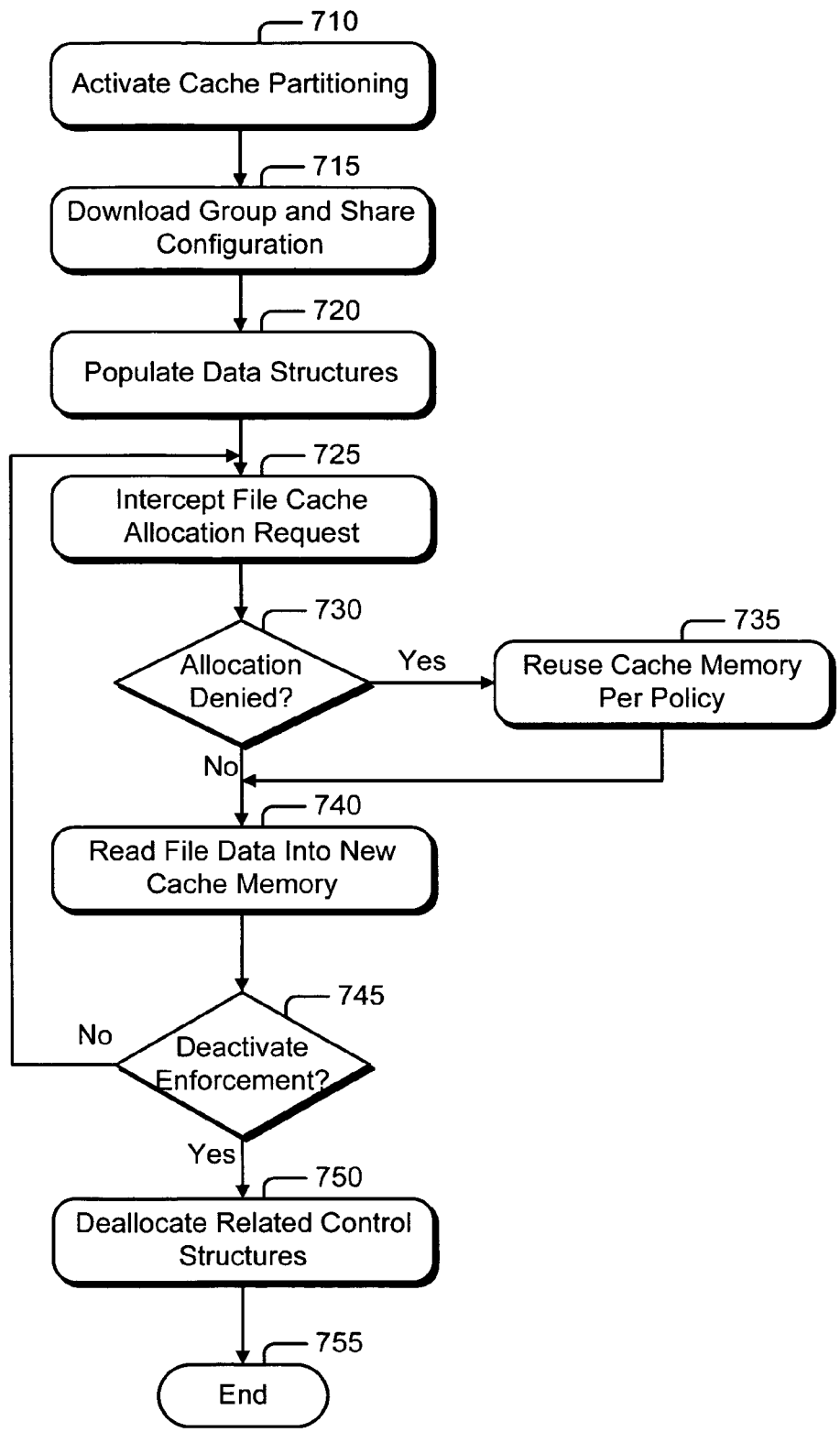
FIG. 7 is a flowchart illustrating operations in one embodiment of an enforcement module of a file access management system.

FIG. 7 is a flowchart illustrating operations in one embodiment of managing cache memory. Referring to FIG. 7, at operation 710 cache partitioning is activated, e.g., by activating the file cache management system 144 via the interface module 160. At operation 715 the group and share configuration is downloaded from the interface module 160. At operation 720 one or more data structures are populated with data such as, e.g., memory allocations for various resource groups.

In operation, the file cache management system 144 intercepts a file cache memory allocation request (operation 725), e.g., from a resource group. If, at operation 730, no cache memory is available for allocation, then control passes to operation 735 and the cache management system 144 reallocates file cache memory according to the cache management policies established via the interface module 160. By contrast, if file cache memory is available for reallocation, then at operation 730 control passes to operation 740 and file data is read into the file cache memory allocated in response to the memory request.

If, at operation 745, there is a request to deactivate enforcement of the cache management policies by the cache management module, then control passes to operation 750 and the control structures used by the cache management system 144 are deallocated and the cache management system terminates at operation 755. By contrast, if at operation 745 there is no request to deactivate enforcement of cache management policies by the cache management system 144, then control passes back to operation 725 and the cache management system 144 waits for another file allocation request.

Exemplary Computing Environment

Select embodiments discussed herein (such as those discussed with reference to FIG. 1) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Figure 8:
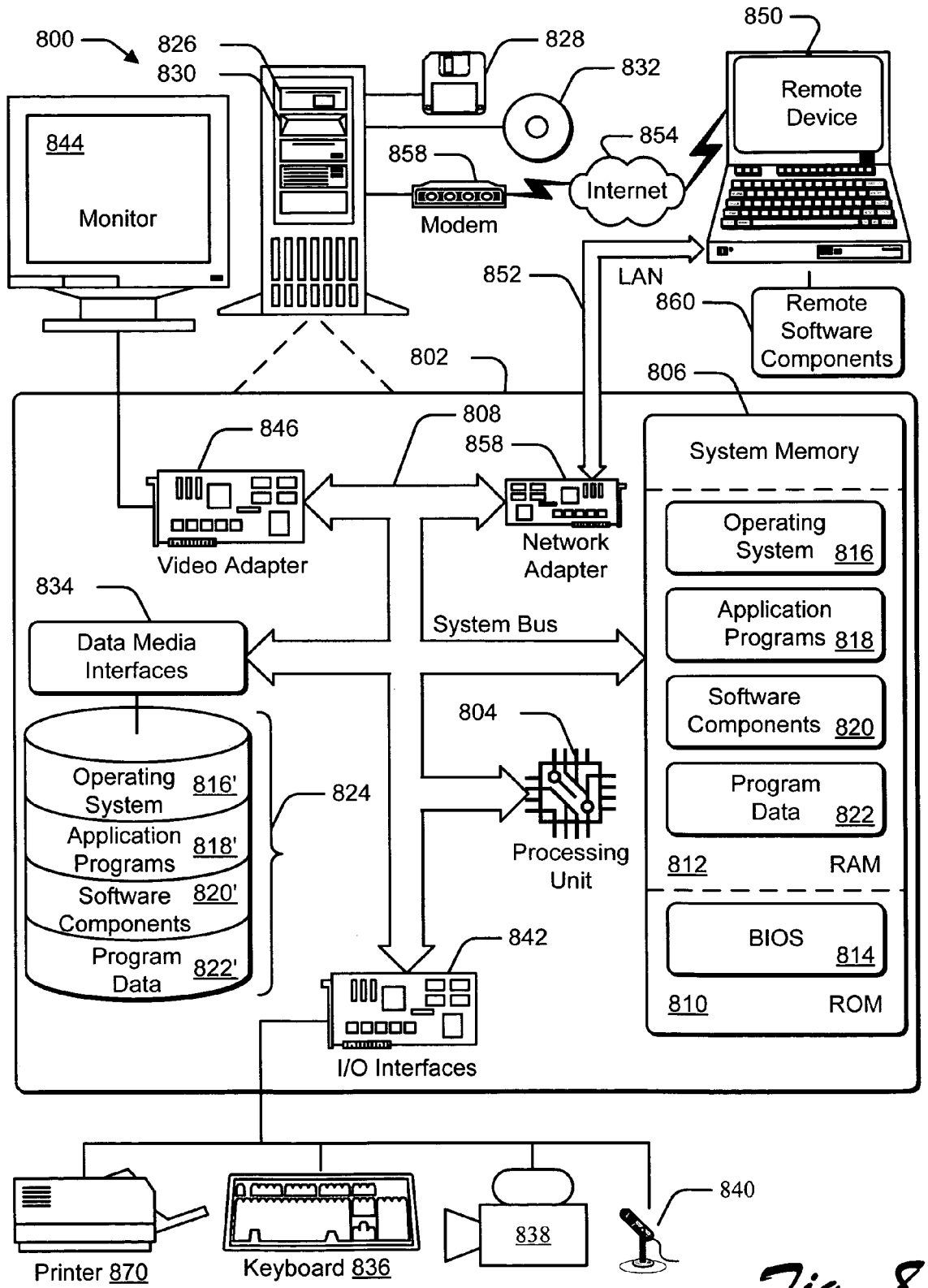
FIG. 8 is a schematic illustration of an exemplary computing environment.

The various components and functionality described herein are implemented with a number of individual computers. FIG. 8 shows components of typical example of such a computer, referred by to reference numeral 400. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 800 may include, but are not limited to, a processing unit 804, a system memory 806, and a system bus 808 that couples various system components including the system memory 806 to the processing unit 804. The system bus 808 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 800, such as during start-up, is typically stored in ROM 810. RAM 812 typically contains data and/or program modules that are immediately accessible to and/or presently being operated on by processing unit 804. By way of example, and not limitation, FIG. 8 illustrates operating system 816, application programs 818, other software components 820, and program data 822.

The computer 800 may also include other removable/non-removable, volatile/nonvolatile computer storage media. By way of example only, the computer system of FIG. 8 may include a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, program modules, and other data for computer 800. In FIG. 8, for example, hard disk drive 824 is illustrated as storing operating system 816', application programs 818', software components 820', and program data 822'. Note that these components can either be the same as or different from operating system 816, application programs 818, software components 820, and program data 822. Operating system 816, application programs 818, other program modules 820, and program data 822 are given different numbers here to illustrate that, at a minimum, they are different copies. A user may enter commands and information into the computer 800 through input devices such as a keyboard 836 and pointing device 838, commonly referred to as a mouse, trackball, or touch pad. Other input devices (not shown) may include a microphone 840, joystick, game pad, satellite dish, scanner, or the like. These and other input devices are often connected to the processing unit 804 through an input/output (I/O) interface 842 that is coupled to the system bus, but may be connected by other interface and bus structures, such as a parallel port, game port, or a universal serial bus (USB). A monitor 844 or other type of display device is also connected to the system bus 806 via an interface, such as a video adapter 846. In addition to the monitor 844, computers may also include other peripheral output devices (e.g., speakers) and one or more printers 870, which may be connected through the I/O interface 842.

The computer may operate in a networked environment using logical connections to one or more remote computers, such as a remote computing device 850. The remote computing device 850 may be a personal computer, a server, a router, a network PC, a peer device or other common network node, and typically includes many or all of the elements described above relative to computer 800. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 800 is connected to the LAN 852 through a network interface or adapter 856. When used in a WAN networking environment, the computer 800 typically includes a modem 858 or other means for establishing communications over the Internet 854. The modem 858, which may be internal or external, may be connected to the system bus 806 via the I/O interface 842, or other appropriate mechanism. In a networked environment, program modules depicted relative to the computer 800, or portions thereof, may be stored in the remote computing device 850. By way of example, and not limitation, FIG. 8 illustrates remote application programs 860 as residing on remote computing device 850. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method of file cache management in a computer system, comprising:
    creating a resource group that will include a set of processes that are running in the computer system, said creating the resource group comprising selecting processes as members of the resource group;
    developing one or more cache management policies for the resource group, wherein the one or more policies are used for managing cache memory in the computer system and are created by use of an interface module;
    downloading the one or more cache management policies from the interface module to a file cache management system that enforces cache management policies; and
    managing one or more subsequent requests for cache memory in accordance with the one or more cache management policies, wherein the one or more subsequent requests are transmitted from a process in the resource group.

2. The method of claim 1, wherein developing one or more cache management policies for the resource group comprises:
    identifying one or more members of the resource group; and
    assigning a minimum share of file cache memory to the one or more members of the resource group.

3. The method of claim 2, further comprising:
    assigning a maximum threshold of cache memory available to the one or more resource groups.

4. The method of claim 1, wherein managing one or more subsequent requests for file cache memory in accordance with the one or more cache management policies comprises:
    receiving a request for file cache memory from a member of a resource group;
    implementing a self reuse algorithm when the resource group has consumed a threshold amount of cache memory.

5. The method of claim 1, wherein managing one or more subsequent requests for file cache memory in accordance with the one or more cache management policies comprises:
    receiving a request for file cache memory from a member of a resource group;
    implementing a global reuse algorithm when the resource group has not consumed a threshold amount of file cache memory.

6. The method of claim 5, wherein implementing a global reuse algorithm comprises reassigning cache memory resources from a first resource group to a second resource group.

7. The method of claim 5, wherein implementing a global reuse algorithm comprises:
    assigning to one or more resource groups a score that represents an amount by which the resource group exceeds a threshold allocation of cache memory resource; and
    reassigning cache memory resources from a resource group with a high score to a resource group with a low score.

8. The method of claim 1, further comprising:
    monitoring file cache memory utilization; and
    modifying the cache management policies in response to a change in available cache memory.

9. A computer system to manage cache memory resources, comprising:
    a processor;
    a memory module including logic instructions stored in a computer-readable medium which, when executed by the processor, configure the processor to:
        create a resource group that will include a set of processes that are running in the computer system, and create the resource group by selecting processes as members of the resource group;
        develop one or more cache management policies for the resource group, wherein the one or more policies are used for managing cache memory in the computer system and are created by use of an interface module;
        download the one or more cache management policies from the interface module to a file cache management system that enforces cache management policies; and
        manage one or more subsequent requests for cache memory in accordance with the one or more cache management policies, wherein the one or more subsequent requests are transmitted from a process in the resource group.

10. The computer system of claim 9, further comprising logic instructions which, when executed by the processor, configure the processor to:
    identify one or more members of the resource group; and
    assign a share of cache memory to the one or more members of the resource group.

11. The computer system of claim 9, further comprising logic instructions which, when executed by the processor, configure the processor to assign a maximum threshold of cache memory available to the one or more members of the resource group.

12. The computer system of claim 9, further comprising logic instructions which, when executed by the processor, configure the processor to:
    receive a request for cache memory from a member of a resource group;
    implement a self reuse algorithm when the resource group has consumed a threshold amount of cache memory.

13. The computer system of claim 9, further comprising logic instructions which, when executed by the processor, configure the processor to:
    receive a request for cache memory from a member of a resource group;

implement a global reuse algorithm when the resource group has not consumed a threshold amount of cache memory.

14. The computer system of claim 13, further comprising logic instructions which, when executed by the processor, configure the processor to reassign cache memory resources from a first resource group to a second resource group.

15. The computer system of claim 13, further comprising logic instructions which, when executed by the processor, configure the processor to:
assign to one or more resource groups a score that represents an amount by which the resource group exceeds a threshold allocation of cache memory resource; and
reassign cache memory resources from a resource group with a high score to a resource group with a low score.

16. The computer system of claim 15, further comprising logic instructions which, when executed by the processor, configure the processor to:
monitor cache memory utilization; and
modify the cache management policies in response to a change in available cache memory.

17. A computer program product comprising computer storage media and logic instructions stored on the computer storage media which, when executed by a computer processor, configure the processor to:
create a resource group that will include a set of processes that are running in the computer system, and create the resource group by selecting processes as members of the resource group;
develop one or more cache management policies for the resource group, wherein the one or more policies are used for managing cache memory in the computer system and are created by use of an interface module;
download the one or more cache management policies from the interface module to a file cache management system that enforces cache management policies; and
manage one or more subsequent requests for cache memory in accordance with the one or more cache management policies, wherein the one or more subsequent requests are transmitted from a process in the resource group.

18. The computer program product of claim 17, further comprising logic instructions which, when executed by the processor, configure the processor to:
identify one or more members of the resource group; and
assign a share of cache memory to the one or more members of the resource group.

19. The computer program product of claim 17, further comprising logic instructions which, when executed by the processor, configure the processor to assign a maximum threshold of cache memory available to the one or more members of the resource group.

20. The computer program product of claim 19, further comprising logic instructions which, when executed by the processor, configure the processor to:
receive a request for cache memory from a member of a resource group;
implement a self reuse algorithm when the resource group has consumed a threshold amount of cache memory.

21. The computer program product of claim 17, further comprising logic instructions which, when executed by the processor, configure the processor to:
receive a request for cache memory from a member of a resource group;
implement a global reuse algorithm when the resource group has not consumed a threshold amount of cache memory.

22. The computer program product of claim 21, further comprising logic instructions which, when executed by the processor, configure the processor to reassign cache memory resources from a first resource group to a second resource group.

23. The computer program product of claim 21, further comprising logic instructions which, when executed by the processor, configure the processor to:
assign to one or more resource groups a score that represents an amount by which the resource group exceeds a threshold allocation of cache memory resource; and
reassign cache memory resources from a resource group with a high score to a resource group with a low score.

24. The computer program product of claim 23, further comprising logic instructions which, when executed by the processor, configure the processor to:
monitor cache memory utilization; and
modify the cache management policies in response to a change in available cache memory.

* * * * *